United States Patent

Takahashi et al.

[11] Patent Number: 6,153,355
[45] Date of Patent: Nov. 28, 2000

[54] OPTICAL RECORDING MEDIUM AND METHOD FOR PREPARING THE SAME

[75] Inventors: Makoto Takahashi; Takashi Kikukawa; Isamu Kuribayashi, all of Nagano, Japan

[73] Assignee: TDK Corporation, Tokyo, Japan

[21] Appl. No.: 09/102,745

[22] Filed: Jun. 23, 1998

[30] Foreign Application Priority Data

Jun. 27, 1997 [JP] Japan .................................. 9-187546
Mar. 5, 1998 [JP] Japan .................................. 10-071412

[51] Int. Cl.$^7$ ........................................................ G11B 7/24
[52] U.S. Cl. .............................. 430/270.13; 430/270.12; 430/945; 369/275.2; 369/288; 428/64.6; 428/913; 428/912
[58] Field of Search ................... 430/270.13, 276.22, 430/945; 369/275.2, 288; 428/64.6, 9 B, 912

[56] References Cited

U.S. PATENT DOCUMENTS

| | | | |
|---|---|---|---|
| 4,670,345 | 6/1987 | Morimoto et al. | 430/945 |
| 5,187,052 | 2/1993 | Maeda et al. | 430/270.13 |
| 5,221,588 | 6/1993 | Morimoto et al. | 430/370.13 |
| 5,305,303 | 4/1994 | Akahira et al. | 430/270.13 |
| 5,362,538 | 11/1994 | Ohbayashi et al. | 430/270.13 |
| 5,627,012 | 5/1997 | Tominaga et al. | 430/270.13 |
| 5,709,978 | 1/1998 | Hirotsune et al. | 430/945 |
| 5,736,657 | 4/1998 | Ide et al. | 430/270.13 |
| 5,789,055 | 8/1998 | Yoon | 430/270.13 |
| 5,796,708 | 8/1998 | Ohkawa et al. | 369/275.5 |
| 5,817,389 | 10/1998 | Ono | 430/270.13 |

FOREIGN PATENT DOCUMENTS

| | | | |
|---|---|---|---|
| 62-204442 | 9/1987 | Japan | 369/275.2 |
| 8-106647 | 4/1996 | Japan . | |
| 8-124218 | 5/1996 | Japan . | |

*Primary Examiner*—Martin Angebranndt
*Attorney, Agent, or Firm*—Laubscher & Laubscher; R. J. Lasker, Esq.

[57] ABSTRACT

In a (Ge,Sb)-Te based optical recording medium of phase change type whose rate determining step in production has been initialization of the recording layer, the time required for production is reduced, and stable recording/reproducing properties are realized from the first overwriting operation. A phase-change type optical recording disc of write once read many-type requiring no initialization is also provided. The optical recording medium comprises a transparent substrate and a recording layer on the transparent substrate. The recording layer comprises at least one Te-based thin film and at least one reactive thin film, and the Te-based thin film is in contact with said reactive thin film. The Te-based thin film is formed from a Te-based material containing at least 95 at % of Te, and the reactive thin film is formed from a (Ge,Sb)-based material mainly comprising Ge and/or Sb. The optical change type material is formed by the mixing of the materials constituting the reactive thin film and Te. After forming the recording layer, the recording layer is irradiated with a continuous laser beam to mix the material constituting the Te-based thin film and the material constituting the reactive thin film.

5 Claims, 2 Drawing Sheets

OPTICAL RECORDING MEDIUM AND METHOD FOR PREPARING THE SAME

BACKGROUND OF THE INVENTION

1. Field of the Invention

This invention relates to an optical recording medium of phase change type and a method for preparing such an optical recording medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystalline state whereupon a change of reflectance by the crystallographic change is detected for reproduction of the information. Optical recording media of the phase change type are of great interest since they can be directly overwritten by modulating the intensity of a single light beam and the optical system of the drive unit used for their operation is simple as compared with magneto-optical recording media.

Most optical recording media of the phase change type used (Ge,Sb)-Te based system including Ge-Te, Sb-Te, or Ge-Sb-Te as the main component, which provides a substantial difference in reflectance between crystalline and amorphous states and have a relatively stable amorphous state.

In the conventional optical recording medium of phase change type, the recording layer has been formed by such means as vacuum deposition apparatus, and the recording layer immediately after its formation is in non-crystalline state. When the disc having such recording layer is utilized for a rewritable medium, crystallization of the recording layer is generally required and such crystallization is accomplished by a process called initialization.

Various processes have been proposed for the initialization. Typical processes are the process wherein the substrate is heated to crystallization temperature of the recording layer after the deposition of the recording layer (JP-A 3131/1990); the process called "solid phase initialization" wherein the recording layer is crystallized after its deposition by laser beam irradiation (JP-A 366424/1992, 201734/1990, and 76027/1991); a process wherein the substrate having the recording layer deposited thereon is irradiated with a flash light to utilize optical properties of the chalcogen compounds for pseudo-crystallization of the recording layer by photodarkening (JP-A 281219/1992); a process wherein the recording layer is crystallized by means of RF induction heating; a process wherein the substrate is heated simultaneously with the deposition of the recording layer for crystallization (JP-A 98847/1990); a process wherein a dielectric layer is formed as the first layer, and the recording layer is formed on the first layer and heated for crystallization, and the second dielectric layer is formed on the crystallized recording layer (JP-A 5246/1990).

Initialization by laser beam irradiation, however, is a time-consuming process and this process also suffers from insufficient productivity. On the other hand, the process involving the heating of the entire medium prohibited use of inexpensive resin substrates, since the heating during the initialization resulted in deformation of the resin substrate to result in tracking problems. Use of flash light required repeated irradiation to accomplish the crystallization, and productivity was also insufficient.

In view of such situation, an apparatus called "bulk eraser" is currently used for the initialization in commercial scale production. A bulk eraser is an apparatus which is capable of irradiating a high power gas laser or semiconductor laser beam without tight focusing so that multiple tracks can be crystallized at once. Use of such bulk eraser enables localized heating of the recording layer, and temperature elevation of the substrate is thus avoided to enable the use of a resin substrate of low heat resistance.

Initialization with a bulk eraser of a 12 cm optical recording disc, however, usually takes about several ten seconds to several minutes and the process of initialization has been the rate-determining step in the production of the optical recording disc.

In order to eliminate the step of initialization which had been necessary in the production of the phase change type recording medium, the inventors of the present invention proposed in the U.S. Pat. No. 5,627,012 formation of the In-Ag-Te-Sb-based recording layer in separate steps of sputtering Sb+In and sputtering Ag+Te; or alternatively, in separate steps of sputtering Sb, sputtering In, and sputtering Ag+Te. The recording layer formed by such step is at least partially crystallized. The recording layer formed by such process exhibits change in reflectance as in the case of initialization by bulk eraser as described above after full diffusion and mixing of the elements in the layer by repeated recording.

The U.S. Pat. No. 5,627,012, supra, however, is silent about the method of reducing the initialization energy for the phase change-type (Ge,Sb)-Te-based recording layer. In addition, in the optical recording medium described in the U.S. Pat. No. 5,627,012, the erasability is unstable during the first several overwriting operations immediately after the formation of the recording layer as in the case of conventional recording medium of phase change type. More specifically, reflectance of the region crystallized during the formation of the recording layer is different from the reflectance of the region crystallized in the overwriting, and the reflectance are not stabilized until whole recording layer are overwritten. In the mark edge recording used in rewritable digital video discs (DVD-RAM) and the like, such variation in the reflectance may be erroneously recognized as mark edge.

JP-A 106647/96 discloses a phase change type recording medium having disposed thereon a recording layer of an AgInSbTe-based artificial superlattice film wherein AgSbTe$_2$ film and In-Sb film are disposed one on another, or AgSbTe$_2$ film, In film and Sb film are disposed one on another. One merit of JP-A 106647/96 is reduction in initialization energy of the whole recording layer owing to the use of the crystallized AgSbTe$_2$ film.

The JP-A 106647/96, however, is silent about the method of reducing the initialization energy in the phase change-type (Ge,Sb)-Te-based recording layer.

SUMMARY OF THE INVENTION

In view of the situation that the initialization of the recording layer has been the rate-determining step in the production of the phase change-type (Ge,Sb)-Te-based optical recording medium, an object of the present invention is to reduce the time required for the production of the medium, and to simultaneously realize stable reflectance from the first overwriting operation. Another object of the present invention is to provide a phase change-type optical recording medium of write-once read multiple-type which requires no initialization and which can not be overwritten at a linear velocity the same as the one used in the recording.

The objects as described above are realized by the optical recording medium and the production method thereof as described below in (1) to (10).

(1) An optical recording medium of phase change type comprising a transparent substrate and a recording layer on the transparent substrate, wherein said recording layer comprises at least one Te-based thin film and at least one reactive thin film, said Te-based thin film is in contact with said reactive thin film, said Te-based thin film is formed from a Te-based material containing at least 95 at % of Te, said reactive thin film is formed from a (Ge,Sb)-based material mainly comprising Ge and/or Sb, and the optical change type material is formed by the mixing of the material constituting the reactive thin film and Te.

(2) The optical recording medium according to the above (1) wherein the Te-based thin film is crystallized.

(3) The optical recording medium according to the above (1) wherein at least one of the Te-based material and the (Ge, Sb)-based material contains a metal M which is at least one element selected from the group consisting of Al, Si, Ti, V, Cr, Mn, Fe, Co, Ni, Cu, Zn, Y, Zr, Nb, Mo, Ru, Rh, Pd, Ag, Cd, In, Sn, La, Ce, Pr, Nd, Sm, Gd, Tb, Dy, Hf, Ta, W, Au, Tl, Pb, and Bi; and said element M is present in the recording layer at a content of not more than 5 at % and said element M is present in the Te-based material at a content of not more than 5 at %.

(4) The optical recording medium according to anyone of the above (1) to (3) wherein said Te-based thin film has a thickness of at least 7 nm.

(5) The optical recording medium according to anyone of the above (1) to (4) wherein the medium has reflectance immediately after the production ($R_o$); reflectance of the crystalline region of the recording layer after repeated recording ($R_c$); and minimum reflectance of the amorphous region of the recording layer after repeated recording ($R_A$) are such that:

$$R_A < R_o \leq R_c$$

when the reflectance is measured from the side of the transparent substrate.

(6) The optical recording medium according to anyone of the above (1) to (5) wherein the material constituting the Te-based thin film and the material constituting the reactive thin film are mixed by irradiating a laser beam to form record marks through such mixing; and the record marks are not crystallizable by the laser beam irradiation at a linear velocity the same as the one used in the formation of the record mark.

(7) A method for producing the optical recording medium according to anyone of the above (1) to (5) including the step of a mixing treatment wherein the recording layer is irradiated with a continuous laser beam to mix the material constituting the Te-based thin film and the material constituting the reactive thin film.

(8) The method for producing an optical recording medium according to anyone of the above (7) wherein linear velocity $V_M$ of the recording layer in relation to the laser beam in the mixing treatment and linear velocity $V_W$ of the recording layer in relation to the laser beam in the overwriting are controlled such that:

$$0.2 V_W \leq V_M$$

(9) The method for producing an optical recording medium according to the above (8) wherein $V_W$ and $V_M$ are controlled such that:

$$V_W \leq V_M$$

(10) The method for producing an optical recording medium according to anyone of the above (1) to (6) including the step of a heat treatment wherein the medium is heat treated at a temperature in the range of 50 to 120° C. after forming the recording layer.

DETAILED DESCRIPTION OF THE INVENTION

Figure 1:
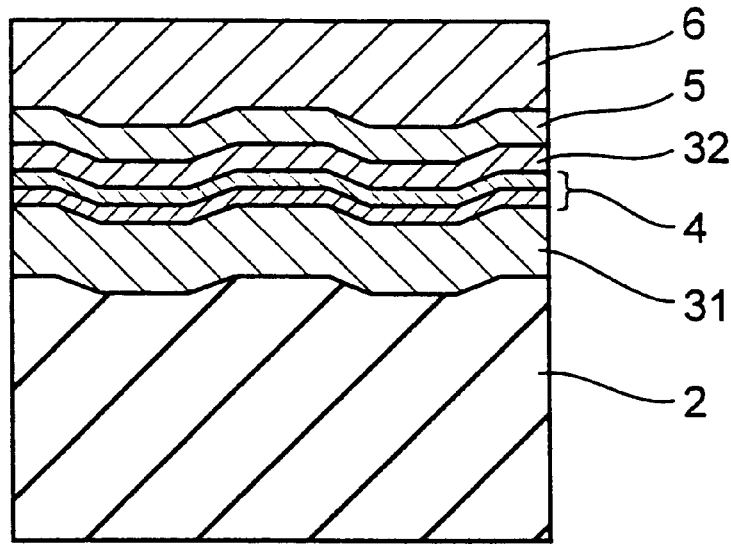
FIG. 1 is a partial cross-sectional view of an embodiment of the optical recording medium according to the present invention.

In the conventional (Ge,Sb)-Te-based recording media of phase change type, initialization (crystallization) is effected by heating and slowly cooling the single layer amorphous recording layer formed by sputtering. After such initialization, laser beam is directed to particular regions of the medium for overwriting. The recording layer of the regions treated with the recording power melts, and through the subsequent quenching, becomes amorphous or microcrystalline. The reflectance is thereby reduced and the record marks are formed. In contrast, the regions treated with the erasing power undergo no change, and the reflectance immediately after the initialization is maintained. In the subsequent overwriting, the regions where the record marks are to be formed are treated with the recording power, and other regions are treated with the erasing power. The regions treated with the recording power turn into the record marks which are either amorphous or microcrystalline with no exception irrespective of whether the regions were crystalline, amorphous, or microcrystalline before the irradiation. The regions treated with the erasing power become crystalline with no exception. The medium is ready for further overwriting.

On the other hand, the optical recording medium of the present invention is prepared by disposing the Te-based thin film and the reactive thin film. In most cases, mixing treatment is conducted after the formation of the recording layer. In the mixing treatment, the recording layer is irradiated with laser beam to heat and mix the elements constituting the Te-based thin film and the elements constituting the reactive thin film. The recording layer which experienced such mixing treatment comprises Te crystalline phase having dispersed therein amorphous phase such as Ge-Sb. The reflectance of the recording layer which is relatively high owing to the crystallized Te-based thin film before the mixing treatment reduces by the mixing treatment. The reflectance after the mixing treatment, however, is higher than that of the amorphous region (record marks).

The mixing treatment is similar to the initialization of the conventional recording medium of phase change type in that the recording layer as formed is brought into recordable state. The difference is that, while the conventional initialization is associated with an increase in the reflectance by the crystallization of the recording layer, the mixing treatment of the present invention is associated with the decrease in the reflectance since the recording layer treated comprises Te crystalline phase having dispersed therein amorphous phase.

After the mixing treatment, the medium will be subjected to the recording and the overwriting similar to those of the conventional phase change type recording media. In the regions irradiated with the recording power, the recording layer will be heated to melt and subsequently quenched to become amorphous or microcrystalline, and the record marks are thereby formed. On the other hand, in the regions irradiated with the erasing power, crystallization of the GeTe$_2$ or Sb$_2$Te$_3$ and the like will take place and the reflectance is thereby increased. The subsequent overwriting operation is conducted as in the case of the conventional phase change type recording medium as described above.

In the present invention wherein the mixing treatment has been conducted, alteration in the reflectance of the record marks and crystalline regions after repeated overwriting is minimized, and the degree of such alteration, namely, the stability of reflectance, is equivalent to that of the conventional recording media of phase change type wherein monolayer noncrystalline recording layer has been initialized.

In the optical recording medium of the present invention, reflectance $R_o$ of the as formed recording layer (before the mixing treatment); reflectance $R_C$ of the crystalline region of the recording layer after repeated recording, and minimum reflectance $R_A$ of the amorphous region (record mark) of the recording layer after repeated recording are such that:

$$R_A < R_o \leq R_C$$

The reflectance are the values obtained by measuring from the side of the substrate. The minimum reflectance $R_A$ of the amorphous region is the value measured when the recording layer became most amorphous to show the lowest reflectance. The reflectance $R_o$ of the recording layer as formed is generally lower than the reflectance $R_C$. In the present invention, however, $R_o$ is relatively high owing to the crystallized Te thin film as described above. For example, $R_o$ may be about 60% of $R_C$ or higher. It is such level of the $R_o$ that enables precise control of the focusing of the laser beam in the mixing treatment to thereby enable uniform mixing treatment. When the reactive thin film is also crystallized, $R_o$ may be further increased to the level equivalent to $R_C$ by optimizing the composition, the thickness, and the like of both thin films and by optimizing the material, quality, thickness, and the like of the dielectric layer and the reflective layer which are formed on the surface of the recording medium together with the recording layer. The mixing treatment may be eliminated in such a case.

As described below, the mixing treatment of the present invention can be conducted at a linear velocity of the medium higher than that of the conventional initialization, and increase in the productivity is thereby enabled.

In the conventional initialization, the single layer, amorphous recording layer formed by sputtering is heated and slowly cooled for crystallization. Such process of heating the recording layer followed by gradual cooling is also conducted upon erasure (crystallization) of the amorphous record marks in the overwriting of the phase change type recording medium. The recording layer as formed and the record marks share the common feature that they are amorphous. The energy state, however, is different, and a higher energy is required for the initialization. Accordingly, a lower linear velocity is required. A lower linear velocity is also required to lower the cooling rate of the medium. If the linear velocity capable of attaining the erasability of −25 dB or less upon overwriting is defined as the overwritable linear velocity, and the linear velocity capable of attaining the best erasability is defined as the optimal velocity, the linear velocity required for the initialization is about ⅓ to ½ of the overwritable optimal linear velocity. Accordingly, the initialization by the laser beam irradiation is quite time consuming.

In contrast, in the present invention, the linear velocity $V_M$ of the recording layer in relation to the laser beam in the mixing treatment and the overwritable optimal linear velocity $V_W$ after the mixing treatment can be such that:

$$V_W \leq V_M$$

Therefore, the time required for the mixing treatment will be significantly shorter than the time required for the conventional initialization. The linear velocity $V_M$ can be increased by increasing the laser beam power used in the mixing treatment. There is no particular upper limit for the $V_M$. However, $V_M$ is generally in such range:

$$V_M \leq 5V_W$$

when the mixing treatment is carried out with a bulk eraser or a recording system commonly used in the art.

When the linear velocity $V_M$ used in the mixing treatment is reduced, the mixing treatment can be accomplished with a laser beam of lower power. Therefore, when the mixing treatment is conducted at a linear velocity equivalent with the conventional initialization, the power of the laser beam used can be markedly reduced. However, it is preferable that: $V_W$ is generally in such range:

$$0.2V_W \leq V_M$$

to accomplish the mixing treatment at a practical speed.

The optical recording medium of the present invention may be used not only as a rewritable-type medium as described above, but also as a write once read many-type medium. When the optical recording medium of the present invention is used as a write once read many-type medium, the mixing treatment of the thin films is not conducted. The write once read many-type medium of the present invention is of the type which can be recorded but which can not be erased when the overwriting procedure as described above is used, namely, when the drive system for a rewritable-type medium is used. More illustratively, the write once read many-type medium of the present invention is of the type wherein the Te-based thin film and the reactive thin film may become mixed when recording power is applied, and wherein the regions which became mixed do not undergo crystallization when erasing power is applied at a linear velocity which is the same as the linear velocity used in the recording. In the optical recording medium of the present invention, reflectance immediately after the production can be increased to a relatively high level, and at the same time, the reflectance may be greatly reduced by the mixing treatment, and therefore, initialization is no longer necessary and the write once read many-type medium having satisfactory properties is realized. It should be noted that the recording layer of write once read many-type can be realized by adjusting the composition and the thickness of the thin layers to appropriate ranges.

PREFERRED EMBODIMENTS OF THE INVENTION

Next, the present invention is described in further detail by referring to the preferred embodiments of the invention.

Recording Layer

The optical recording medium of the present invention comprises a transparent substrate and a recording layer on the transparent substrate, and the recording layer comprises at least one tellurium (Te)-based thin film and at least one reactive thin film. In the recording layer, the Te-based thin film is in contact with the reactive thin film.

The Te-based thin film is formed by sputtering a Te-based material containing 95 at % or more of Te, and preferably 97 at % or more of Te. The Te-based thin film may preferably have a thickness of 7 nm or more. When the Te-based thin film has an insufficient Te content or an insufficient thickness, the Te-based thin film will not be sufficiently crystallized, and the merit of facilitating the initialization will not be realized.

The reactive thin film is formed from a material which will form a phase change material by mixing with Te, and more illustratively, from a (Ge, Sb) based material which contains Ge; Sb; or Ge and Sb as its main component. The ratio of Ge and Sb may be appropriately determined according to the desired composition of the recording layer.

The Te-based thin film and/or the reactive thin film preferably contains element M. The element M is at least one element selected from the group consisting of Al, Si, Ti, V, Cr, Mn, Fe, Co, Ni, Cu, Zn, Y, Zr, Nb, Mo, Ru, Rh, Pd, Ag, Cd, In, Sn, La, Ce, Pr, Nd, Sm, Gd, Tb, Dy, Hf, Ta, W, Au, Tl, Pb, and Bi. The element M is added for the purpose of improving stability of the noncrystalline phase and improving S/N of the signals. Of the elements listed above, the preferred are Si, Ti, V, Cr, Ni, Zn, Sn, W, Pb and Bi since their effects are outstanding.

The content of the element M in the total recording layer is preferably 5 at% or less, and more preferably, 3 at % or less. If the content of element M is too high, change of reflectance associated with a phase change becomes too small to provide a sufficient degree of modulation. The content of the element M in the recording layer is preferably 0.5 at % or more to reliably realize the effects as described above.

When the Te-based material contains the element M, the content of the element M in the Te-based material is 5 at % or less, and preferably, 3 at % or less. If the content of element M in the Te-based material is too high, formation of Te microcrystals during the formation of the Te-based thin film by sputtering will be suppressed by the element M, and crystallization of the Te-based thin film will not be promoted to detract from the merits of the present invention. The Te-based thin film preferably comprises substantially Te alone, or Te and the element M.

The thickness of the Te-based thin film and the reactive thin film may be adequately determined in accordance with the composition of both thin films such that the recording layer may have the desired composition (the composition after the mixing of both thin films).

The thickness of the Te-based thin film, however, is preferably at least 7 nm, and more preferably, at least 10 nm. When the Te-based thin film is too thin, the Te-based thin film formed will be rather amorphous and will not be a uniform, crystalline film, and the merit of the present invention is not realized. The upper limit of the Te-based thin film is determined by the thickness required for the recording layer and the composition of both thin films, and in general, the upper limit of the Te-based thin film is approximately 12 nm.

The thickness of the reactive thin film is generally in the range of approximately 8 to 11 nm. The reactive thin film may not necessarily be continuous.

It should be noted that the thickness of the thin films are described herein in terms of the values calculated by multiplying film deposition rate by film deposition period.

The recording layer may comprise one Te-based thin film and one reactive thin film. However, when the recording layer comprises three or more thin films, the energy required for the mixing may be reduced. When the recording layer comprises three or more thin films, the recording layer may either comprise the thin films of an even number wherein the Te-based thin films and the reactive thin films are alternately deposited, or the thin films of an odd number wherein the uppermost and the lowermost thin films are the same type of the thin films. The recording layer, however, may preferably be of the constitution wherein thin films of an odd number are deposited such that the uppermost and the lowermost thin films are reactive thin films, namely, of the constitution wherein all of the Te-based thin films are sandwiched by the reactive thin films. The mixing between the materials constituting both thin films will then proceed rapidly and uniformly, and less energy will be required for the mixing.

The number of interfaces in the recording layer between the Te-based thin films and the reactive thin films is preferably up to ten since too many thin films will result in an excessively increased thickness of the recording layer. The number of interfaces is more preferably such that the recording layer has a thickness of up to 50 nm. When the recording layer is too thick, heat release action of the dielectric layer will be insufficient, and the edge of the record marks may become deformed to adversely affect the jitter and the error rate.

It should be noted that the recording layer may preferably have a thickness of at least 15 nm. When the recording layer is too thin, development of the crystalline phase will be difficult, and the alteration in the reflectance associated with the phase change will be insufficient.

In the recording layer (the Te-based thin film(s) plus the reactive thin film(s)), the atomic ratio of the constituent elements is preferably represented by the formula (I):

$$(Ge_aSb_bTe_{1-a-b})_{1-c}M_c \tag{I}$$

wherein letters a, b and c are in the range: $0 \leq a \leq 1$, $0 \leq b \leq 1$, and $0 \leq c \leq 0.05$, and more preferably, in the range: $0.005 \leq c \leq 0.03$.

In the optical recording medium of write once read many type, a and b may be adequately determined so that the recording layer will exhibit an appropriate crystallization rate in accordance with the linear velocity of the recording.

In the optical recording medium of overwriting type, a and b are preferably in the range: $0.05 \leq a \leq 0.25$ and $0.20 \leq b \leq 0.40$, and more preferably, in the range : $0.08 \leq a \leq 0.22$ and $0.22 \leq b \leq 0.33$. When a is too small in the optical recording medium of overwriting type, crystallization of the record marks will be difficult to adversely affect the erasability. When a is too large, a large amount of Te will be used in binding with Ge to result in the precipitation of Sb, and in such a case, formation of the record marks will be difficult. When b is too small, the amount of Te will be too much to adversely affect the reliability since the record marks will then tend to crystallize during the storage at a high temperature. When a is too large, Sb will precipitate and formation of the record marks will be difficult.

When c is too small, the merits of adding the element M will not be sufficiently realized. When c is too large, the composition will deviate from the eutectic composition, and the crystallization rate will rapidly decrease with the increase in the value of c to result in poor erasability.

Formation of the Recording Layer

In the embodiments as described above, the Te-based thin film and the reactive thin film may preferably be formed by sputtering. Such formation of the Te-based thin film by sputtering promotes formation of the Te microcrystals, and the crystallization required for the Te-based thin film will be substantially completed at the stage when the Te-based thin film and the reactive thin film are formed. The conditions of the sputtering are not particularly limited. For example, when a material containing two or more elements is sputtered, the sputtering may be conducted by using an alloy target, or alternatively, by multiple sputtering using two or more targets. The Te-based thin film and the reactive thin film may be deposited in any order. However, when the optical recording medium is used as a medium of write once read many type, the Te-based thin film is first formed so that the Te-based thin film will be formed on the side of the recording light incidence. Formation of the thin films in this order enables the so called High-to-Low recording wherein the reflectance before the recording is high and the reflectance after the recording is low.

When the Te-based thin film has an insufficient crystallinity, crystallization of the Te-based thin film can be promoted by heat treating the recording layer, and therefore, the recording layer may be subjected to an optional heat treatment after the formation of the recording layer to thereby promote the crystallization. Such optional heat treatment is preferably conducted at a heat treatment temperature of 50 to 120° C. An excessively low heat treatment temperature will require an excessively long period for the crystallization. An excessively high heat treatment temperature will result in the damage of the substrate when the substrate is formed from a resin such as polycarbonate. The heat treatment period is not limited to any particular range so long as the heat treatment is continued until the reflectance is saturated. The heat treatment is generally conducted for a period of at least 1 hour and preferably at least 3 hours. Such heat treatment may be conducted by heating the whole optical recording medium in an oven or the like.

The heat treatment as described above is particularly effective when the optical recording medium of the present invention is used as a medium of write once read many type. When the optical recording medium of the present invention is used as a medium of write once read many type, the degree of crystallization of the Te-based thin film is critical since the medium is not subjected to the mixing treatment. When the Te-based thin film has a higher degree of crystallization, difference in the reflectance between the record mark and the surrounding region will be sufficient to enable higher degree of modulation. The heat treatment as described above is also effective for stabilizing the recording/reproducing properties of the medium of write once read many type. In the formation of the record mark by irradiating the record light, the temperature of the region surrounding the record mark is also elevated, and when the crystallization of the Te-based thin film is insufficient, the region surrounding the record mark will also experience crystallization, and hence increase in the reflectance. In such case, wave form of the reproduced signal will be altered to invite increase in the jitter and the errors. On the other hand, when the crystallization of the Te-based thin film is sufficient and the reflectance is substantially saturated, the region surrounding the record mark will not experience increase of the reflectance.

It should be noted that when the optical recording medium of the present invention is used as a medium of overwriting type, insufficiency in the crystallization of the Te-based thin film can be obviated, for example, by adequately controlling the conditions of the mixing treatment, and therefore, the heat treatment as described above is only carried out in the case of the medium of write once read many type. However, when a medium of overwriting type is subjected to the heat treatment as described above, the heat treatment has the merit of facilitating the focus servo of the laser beam in the mixing treatment.

The heat treatment as described above may also serve an index for the degree of crystallization of the Te-based thin film. Improvement in the reflectance of the recording layer by the heat treatment as described above indicates insufficiency in the crystallization of the Te-based thin film. On the other hand, if the reflectance of the recording layer was not improved by the heat treatment, namely, in the case when the reflectance was saturated, recording layer has been sufficiency crystallized. In practical point of view, the recording layer can be regarded as sufficiently crystallized when the reflectance before the heat treatment is higher than 95% of the reflectance after the heat treatment, and the heat treatment is not required.

Mixing Treatment and Overwriting

The mixing treatment of the optical recording medium of the present invention is preferably performed by irradiating a laser beam as described above. It should be noted that the mixing treatment can be accomplished by heat treating whole optical recording medium in a heat treating means such as an oven. In such a case, however, inexpensive resin substrate can not be used since the heat treatment should be effected at a relatively high temperature to enable sufficient mutual diffusion between the Te-based thin film and the reactive thin film.

The overwriting of the optical recording medium of the present invention is performed as described above. The recording power may be applied in pulse mode. When one signal is recorded by at least two divided portions of irradiation, the heat accumulation in the record mark is suppressed, and then, the dilation of the trailing edge of the record mark (known as a teardrop phenomenon) can be prevented, leading to an improved C/N. The irradiation in pulse mode also improves the erasability. The values of the recording power and the erasing power used in practice can be determined without undue experimentation. The reading laser beam should be of a low power so that the crystalline state of the recording layer may not be affected thereby.

When the optical recording medium of the invention is recorded, the linear velocity of the recording layer in relation to the laser beam is generally about 0.8 to 20 m/s, preferably 1.2 to 16 m/s. overwritable optimal linear velocity may be controlled by adjusting the composition of the recording layer. That is, the overwritable optimal linear velocity may be increased by increasing the Te content.

The light used for the mixing treatment, overwriting and reading of the optical recording medium of the invention may be selected from the wavelength of a wide range, for example, 100 to 5,000 nm.

Structure of the Medium

Optical Recording Medium of FIG. 1

An embodiment of the optical recording medium according to the present invention is shown in FIG. 1. This optical recording medium is a single side (single substrate) optical recording medium which has a first dielectric layer 31, a recording layer 4, a second dielectric layer 32, a reflective layer 5, and a protective layer 6 on a substrate 2. The present invention is applicable for a double side recording medium comprising two single side recording media which are adhered to each other by an intervening adhesive layer such that the protective layer 6 is located in the interior side of the resulting medium. The present invention is also applicable for a medium comprising the single side recording medium as described above adhered to a protective substrate by an intervening adhesive layer.

Dielectric Layers 31 and 32

The first dielectric layer 31 plays the role of preventing oxidation of the recording layer 4 and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The dielectric material used for the first and the second dielectric layer is not limited to any particular type, and various dielectric materials or a mixture thereof as well as various transparent ceramics such as silicon oxide, silicon nitride and $ZnS-SiO_2$ and various species of glass may be used. Also useful are so-called LaSiON materials containing La, Si, O, and N, so-called SiAlON materials containing Si, Al, O, and N, SiAlON containing yttrium, etc.

In the present invention, at least one of the first and the second dielectric layers may preferably contain zinc sulfide, ZnS for optimization of properties such as refractive index. The dielectric layer containing zinc sulfide is hereinafter referred to as ZnS-containing dielectric layer. The ZnS-containing dielectric layer may preferably contain an element whose standard free energy of sulfide formation is lower than the standard free energy of ZnS formation at 0 to 1000° C. (hereinafter referred to as metal element A). Incorporation of the metal element A in the ZnS-containing dielectric layer results in the suppressed release of sulfur upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of $Na_2S$ formation is about −400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semi-metal such as silicon is included in the "total metal elements" in the dielectric layer.

The metal element A in the dielectric layer may take form of simple substance, sulfide, oxide, fluoride, or the like.

The ZnS-containing dielectric layer may preferably contain compounds other than zinc sulfide, for example, an oxide, nitride or fluoride. Preferably, such compound is at least one member selected from silicon oxides ($SiO_2$, SiO), tantalum oxide ($Ta2O_5$), titanium oxide ($TiO_2$), lanthanum oxide ($La_2O_3$), silicon nitride ($Si_3N_4$), aluminum nitride (AlN), magnesium fluoride ($MgF_2$), sodium fluoride (NaF) and thorium fluoride ($ThF_4$).

The content of the zinc sulfide in the ZnS-containing dielectric layer is preferably in the range of from 50 to 95 mol %, and more preferably from 70 to 90 mol %. When the content of the zinc sulfide is insufficient, heat conductivity will be too high and refractive index will be too low, and high C/N can not be obtained. On the other hand, an excessively high zinc sulfide content results in poor rewriting durability. The content of the zinc sulfide in the dielectric layer is calculated in terms of sulfur and zinc contents measured by fluorescent X-ray analysis or the like, and for example, when the zinc content measured is in excess of the sulfur content, the excess zinc is deemed to be present in the form of a compound other than zinc sulfide, for example, ZnO.

An embodiment wherein the metal element A is added to the ZnS-containing dielectric layer has been described in the foregoing. Alternatively, an intermediate layer containing the metal element A may be disposed between the ZnS-containing dielectric layer and the recording layer. Examples of such intermediate layer include the layer containing cerium oxide ($CeO_2$) as simple substance, and the layer containing a mixture of $ZnS-CeO_2$ mixture.

When either one of the first and the second dielectric layers is the ZnS-containing dielectric layer, the dielectric material used for the other dielectric layer, namely, the dielectric layer containing no ZnS is not limited to any particular type, and the dielectric materials as mentioned above other than the zinc sulfide or a mixture thereof may be used.

The lower and the upper dielectric layers may preferably have a refractive index of at least 1.4, especially at least 1.8 in the wavelength range of 400 to 850 nm. This wavelength range covers 780 nm which is the wavelength used in current CD players and 630–680 nm which is a candidate wavelength of the next generation recording technology and represents the range over which the optical recording medium having the recording layer as described below is advantageously operated.

The first dielectric layer 31 is preferably about 50 to 300 nm thick, more preferably 100 to 250 nm thick. Within this thickness range, the first dielectric layer is effective for preventing any damage to the substrate upon recording and higher degree of modulation is available. The second dielectric layer 32 is preferably about 10 to 30 nm, more preferably about 13 to 20 nm thick. This thickness range ensures a fast cooling rate and thus permits to define a record mark with a clear edge, resulting in reduced jitter. Also higher degree of modulation is available.

The dielectric layers are preferably formed by vapor deposition such as sputtering and evaporation, and the metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as $ZnS$-$SiO_2$, or alternatively, ZnS and $SiO_2$ may be separately used for the main targets in simultaneous sputtering.

The ZnS-containing dielectric layer may be deposited by conventional sputtering in argon atmosphere. However, when the metal element A as described above is incorporated in the ZnS-containing dielectric layer, the sputtering is preferably effected in a mixed atmosphere of argon and oxygen. The sputtering in such mixed atmosphere enhances the effect of suppressing jitter increase upon repeated overwriting. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of flow rate ratio $O_2/(Ar+O_2)$ is preferably 30% or less, and more preferably 25% or less. Excessive introduction of the oxygen is undesirable since the recording power decreases with no difference in the erasing power, and the erasing power margin will be extremely narrow. The oxygen is preferably introduced to a flow rate ratio of 5% or higher, and more preferably, to a flow rate ratio of 10% or higher in order to fully enjoy the effects of oxygen introduction.

Recording Layer 4

The constitution of the recording layer 4 is as described above.

Reflective Layer 5

The reflective layer 5 may be formed from any desired material, and typically, the reflective layer 5 is formed from a metal of high reflectance such as Al, Au, Ag, Pt, or Cu as a simple substance or as an alloy containing at least one of such metals. The reflective layer is preferably about 30 to 200 nm thick. Reflectance will be insufficient with a thickness below this range. A thickness beyond this range will provide no substantial improvement in reflectance and add to the cost. The Reflective layer is preferably formed by vapor deposition such as sputtering and evaporation.

Protective Layer 6

The protective layer 6 is provided for improving scratch resistance and corrosion resistance. Preferably the protective layer is formed of an organic material, typically a radiation curable compound or a composition thereof which is cured with radiation such as electron and UV radiation. The protective layer is generally about 0.1 to 100 $\mu$m thick and may be formed by conventional techniques such as spin coating, gravure coating, spray coating, and dipping.

Adhesive Layer

The adhesive used for the adhesive layer is not limited to any particular type, and the adhesive may be a hot melt adhesives, a UV curing adhesive, or a room temperature curing adhesive, or alternatively, a pressure sensitive adhesive.

Figure 2:
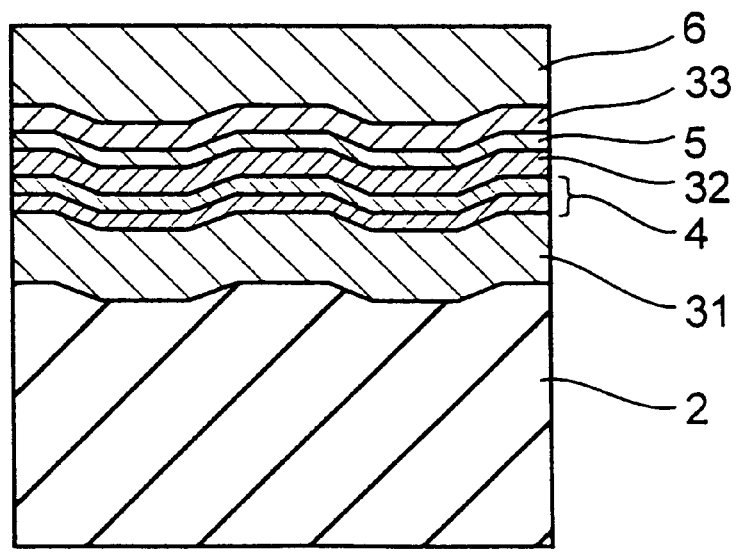
FIG. 2 is a partial cross-sectional view of another embodiment of the optical recording medium according to the present invention.

Optical Recording Medium of FIG. 2

Referring to FIG. 2, there is illustrated another embodiment of the optical recording medium according to the present invention. The optical recording medium of this structure has been fabricated for the purpose of suppressing increase of jitter upon overwriting. In the present invention, the optical recording medium of this type is referred as the medium of absorption coefficient correction structure. The reason for selecting such absorption coefficient correction structure is described in the following.

The optical recording medium of phase change type utilizes difference in reflectance between the crystalline and the noncrystalline state, and light absorption (Ac) of the recording layer in the region other than record marks (in crystalline state) and the light absorption (Aa) of the recording layer in the record marks (in noncrystalline state) are often different, and the Ac<Aa is the condition generally found in such situation. Recording sensitivity and erasability are thus different depending on whether the region overwritten is crystalline or noncrystalline, and consequently, the record marks of different length and width are formed by the overwriting to invite increase in the jitter often resulting in errors. When mark edge recording wherein the information is encoded in opposite edges of the record marks is adopted for increasing the recording density, variation in the length of the record marks has greater significance and such variation invites increased errors.

In order to solve such a situation, the light absorption (Ac) and the light absorption (Aa) are preferably adjusted such that the light absorption (Ac) is in the proximity of the light absorption (Aa), and more preferably such that $Ac/Aa \geq 0.9$, still more preferably such that $Ac/Aa \geq 1$, and most preferably such that $Ac/Aa > 1$ in consideration of the latent heat by regulating the thickness of the recording layer or the dielectric layers sandwiching the recording layer. In the medium of conventional structure, an adjustment to increase Ac/Aa results in a reduced difference between the reflectance (Rc) of the medium of the region other than the record marks and the reflectance (Ra) of the medium in the record marks, and hence, in a reduced C/N.

JP-A 124218/96 proposes an optical information recording medium comprising a substrate, a first dielectric layer, a recording layer, a second dielectric layer, a reflective layer, a third dielectric layer, and a UV curing resin layer disposed in this order wherein Ac>Aa, and an extremely thin film of a metal of high light transmission or a layer of silicon or germanium is used for the reflective layer, and a dielectric material having a refractive index of higher than 1.5 is used for the third dielectric layer. Increase in Ac/Aa is achieved without detracting from the high (Rc-Ra) by providing the reflective layer of high light transmission and the third dielectric layer of high refractive index.

It should be noted that the Ac and the Aa can be calculated from the optical constants of the recording layer, the dielectric layers, the reflective layer, and the like and the wavelength of the recording/reproducing laser beam.

The optical recording medium of FIG. 2 is a single side recording medium wherein the reflective layer 5 is of the constitution as in the case of JP-A 124218/96, and wherein a third dielectric layer 33 is disposed between the reflective layer 5 and the protective layer 6. As in the case of the single side recording medium of FIG. 1, the optical recording medium of FIG. 2 may be adhered with another such medium to form a dual side recording medium, or alternatively, the medium may be adhered to a protective substrate.

In the medium of FIG. 2, the reflective layer 5 may comprise an extremely thin film of a metal of high light transmission or a layer of silicon or germanium having a high transmission for the light of near infrared to infrared region including the recording/reproducing wavelength. The thickness of the reflective layer may be adequately determined to enable the absorption correction between the region other than the record marks and the record marks as described above. The range of the preferable thickness of the reflective layer is significantly different by the material constituting the reflective layer, and the thickness may be determined in accordance with the material. When a metal such as Au is used for the reflective layer, the reflective layer may preferably have a thickness of up to 40 nm, and more preferably 10 to 30 nm. When Si or Ge is used for the reflective layer, the reflective layer may preferably have a thickness of up to 80 nm, and more preferably from 30 to 70 nm. A thickness below this range will invite decline of C/N, and a thickness beyond this range will provide no substantial improvement in the absorption coefficient correction effect.

When the reflective layer 5 is formed from a metal, the reflective layer may preferably comprise Au or an alloy thereof. The Au alloy may comprise the main component of Au and at least one alloying component selected from Al, Cr, Cu, Ge, Co, Ni, Mo, Ag, Pt, Pd, Ta, Ti, Bi and Sb.

The reflective layer 5 is preferably formed by vapor deposition such as sputtering and evaporation.

The third dielectric layer 33 optionally formed on the reflective layer 5 is preferably formed from a material which has a refractive index higher than the protective layer 6. By providing such third dielectric layer 33, the Ac/Aa as described above can be increased while maintaining the difference in reflectance between the record marks and the region other than the record marks at a sufficient level as in the case of JP-A 124218/96 (corresponds to U.S. Pat. No. 5,719,006).

The third dielectric layer 33 may be formed from a material selected from those described for the first and second dielectric layers. The third dielectric layer, however, is not in direct contact with the recording layer, and therefore, does not necessarily contain the metal element A as described above.

The third dielectric layer may preferably have a thickness of 30 to 120 nm, and more preferably 40 to 90 nm. An excessively thin third dielectric layer results in the decline of the signal output, and an excessively thick third dielectric layer results in the erasure of the signals in the adjacent track (cross erasure).

As described above, in the structure wherein Ac and Aa are controlled, a part of the recording/reproducing laser beam directed from the lower side of the transparent substrate generally passes through the medium to be emitted from the side of the reflective layer. The light transmittance in such instance, namely, the percentage of the transmitted light per incident light is generally at least about 1%, and in most cases, at least about 3%. It should be noted that this light transmittance is the value measured when the medium solely comprises the transparent substrate and the inorganic layers, namely, the value measured for the medium of FIG. 2 having no protection layer 6. Therefore, the light transmittance is the value as a result of multiple reflection between the inorganic layers, that is, the recording layer, the dielectric layers, and the reflective layer. This light transmittance can be measured with a spectrophotometer. The region measured is not particularly limited, and the light transmittance may be measured either for a crystalline region or for a noncrystalline region. The light transmittance, however, is generally measured for the crystalline region wherein no grooves are defined (mirror region).

In the optical recording medium of FIG. 2, the substrate 2, the first dielectric layer 31, the recording layer 4, the second dielectric layer 32, and the protective layer 6 may be of the constitution as in the case of the optical recording medium of FIG. 1.

EXAMPLES

Examples of the present invention are given below by way of illustration and not by way of limitation.

Example 1

A disc shaped substrate 2 having a diameter of 120 mm and a thickness of 0.6 mm was prepared by injection molding polycarbonate. A groove was formed in one major surface of the substrate simultaneous with the injection molding. The groove had a width of 0.74 $\mu$m, a depth of 65 nm, and a pitch of 1.48 $\mu$m. On the grooved surface of the substrate, there were formed a first dielectric layer 31, a recording layer 4, a second dielectric layer 32, a reflective layer 5, and a protective layer 6 to produce the optical recording disc sample of the constitution as depicted in FIG. 1.

The first dielectric layer 31 was formed by using ZnS and $SiO_2$ for the target. $SiO_2/(ZnS+SiO_2)$ was 15 mol %. The first dielectric layer 31 was deposited to a thickness of 175 nm.

Next, recording layer 4 was formed by depositing Te-based thin film (Te, 100%) of 11 nm thick and reactive thin film ($Ge_{0.5}Sb_{0.5}$) of 9 nm thick in this order by means of sputtering. The composition of the reactive thin film was determined by ICP. In the Examples of the present invention, the composition in regard of the recording layer is described in terms of atomic ratio. After the formation of the recording layer, the crystalline state was examined by electron diffraction, and it was then confirmed that the Te-based thin film was crystallized while the reactive thin film was noncrystalline.

Second dielectric layer 32 was deposited to a thickness of 20 nm by a similar procedure as the first dielectric layer 31.

The reflective layer 5 was formed to a thickness of 150 nm by sputtering an Al-Cr target. The protective layer 6 was formed by applying a UV curable resin by spin coating and exposing it to UV for curing. The protective layer as cured had a thickness of 5 $\mu$m.

The thus produced optical recording disc of phase change type was designated Sample 1A.

For comparison purpose, Sample 1B was prepared by repeating the production procedure of Sample 1A except that a recording layer of monolayer structure was formed by using an alloy target. The thickness of the recording layer in Sample 1B was the same as the total thickness of the Te-based thin film and the reactive thin film. The composition of the recording layer in Sample 1B was the same as the composition of the Te-based thin film+the reactive thin film.

The reflectance ($R_o$) of the samples immediately after the production was 16.7% in Sample 1A and 7.9% in Sample 1B. The reflectance in the Examples of the present invention is the value determined from the RF signal output of the disc evaluator when the reproducing light is directed from the side of the transparent substrate. The wavelength used for the measurement was 637 nm unless otherwise noted.

Next, the treatment and the evaluation as described below was conducted by using a disc evaluator at a wavelength of 637 nm and NA of 0.6. The samples were recorded with (1–7) RLL recording signals with pulse division.

The recording layer was initialized (crystallized) by rotating Sample 1B at a linear velocity of 2 m/s and directing a laser beam at a power of 8 mW. After the initialization of the recording layer, the reflectance increased to 16.8%. The rewritable optimal linear velocity after the initialization was measured to be 6 m/s. Accordingly, the linear velocity in the initialization is 1/3 of the rewritable optimal linear velocity. It should be noted that the recording layer could not be crystallized at a linear velocity of 6 m/s which is equal to the rewritable optimal linear velocity.

Next, Sample 1A was rotated at a linear velocity of 6 m/s, and irradiated with a laser beam at a power of 5 mW. After the irradiation with the laser beam, the reflectance decreased to 12.8% to confirm the mixing of the Te-based thin film and the reactive thin film. The rewritable optimal linear velocity of Sample 1A was measured to be 6 m/s to demonstrate that the mixing treatment could be accomplished at the linear velocity equal to the rewritable optimal linear velocity.

Figure 3:
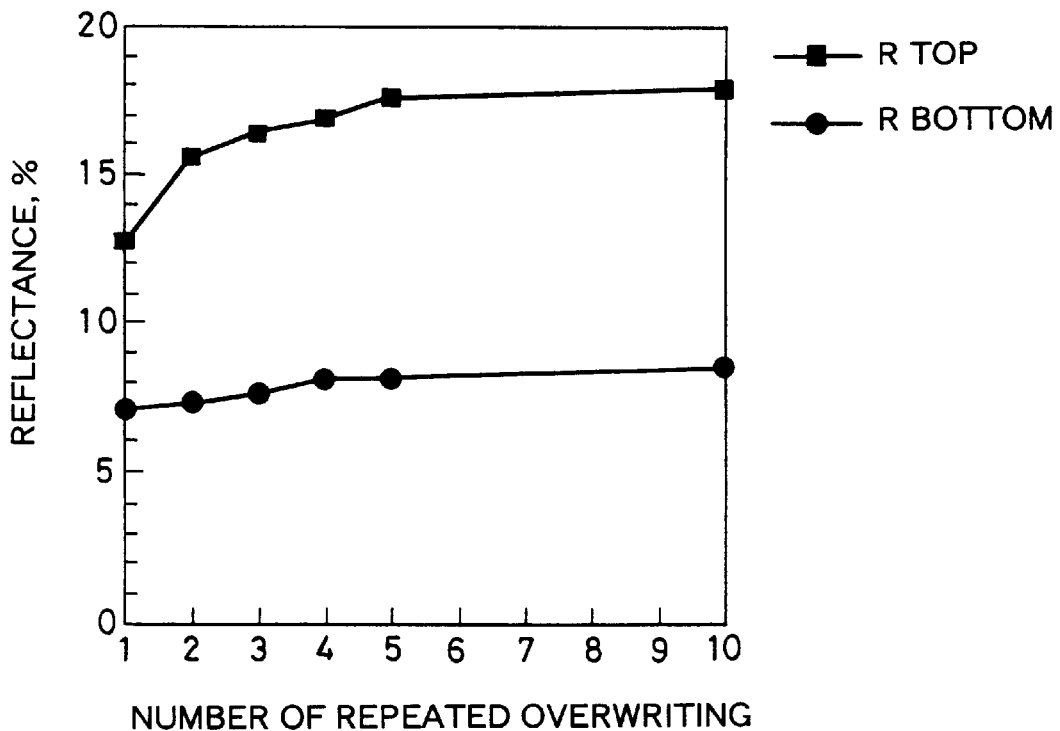
FIG. 3 is a graph showing reflectance $R_{top}$ of crystalline portion and reflectance $R_{bottom}$ of non-crystalline portion in relation to the number of repeated overwriting operations when the optical recording medium of phase change type is repeatedly overwritten in one sample of the invention.

Sample 1A after the mixing treatment was overwritten at a recording power of 11 mW and an erasing power of 5 mW to examine the alteration in reflectance associated with the repeated overwriting. The results are shown in FIG. 3, wherein reflectance $R_{top}$ of the erased region and reflectance $R_{bottom}$ of the record mark are depicted. In the case of Sample 1A, the reflectance of the crystalline region ($R_C$) was 17.8% and the reflectance of the amorphous region ($R_A$) was 8.4% after repeated overwriting for ten times. As demonstrated in FIG. 3, the reflectance became stabilized after the second overwriting operation. In addition, since the power used in the mixing treatment is equal to the erasing power, and the linear velocity in the mixing treatment is equal to the rewritable optimal linear velocity, the mixing treatment can be accomplished rapidly and at a power less than the initialization.

Sample 1B was overwritten in a similar manner. After overwriting for 10 times, the reflectance of the crystalline region ($R_C$) was 17.0% and the reflectance of the amorphous region ($R_A$) was 8.0%.

Example 2

Sample 2A was prepared by repeating the production procedure of Sample 1A of Example 1 except that the recording layer was of trilayer structure. The recording layer formed comprised the reactive thin film, the Te-based thin film, and the reactive thin film in this order from the side of the substrate. The Te-based thin film had a composition the same as that of Sample 1A, and was deposited to a thickness of 11 nm. The reactive thin film had a composition the same as that of Sample 1A, and was deposited to a thickness of 4.5 nm. Total thickness of the recording layer was 20 nm which is the same as Sample 1A. Crystallization of the Te-based thin film was confirmed by electron diffraction while the reactive thin film was noncrystalline. The reflectance ($R_o$) of Sample 2A was 15.7%. Sample 2A was subjected to the mixing treatment as in the case of Sample 1A at a linear velocity of 6 m/s, and a power of 5 mW. The reflectance after the mixing treatment was 13.4%. The rewritable optimal linear velocity examined after the mixing treatment was 6 m/s.

Figure 4:
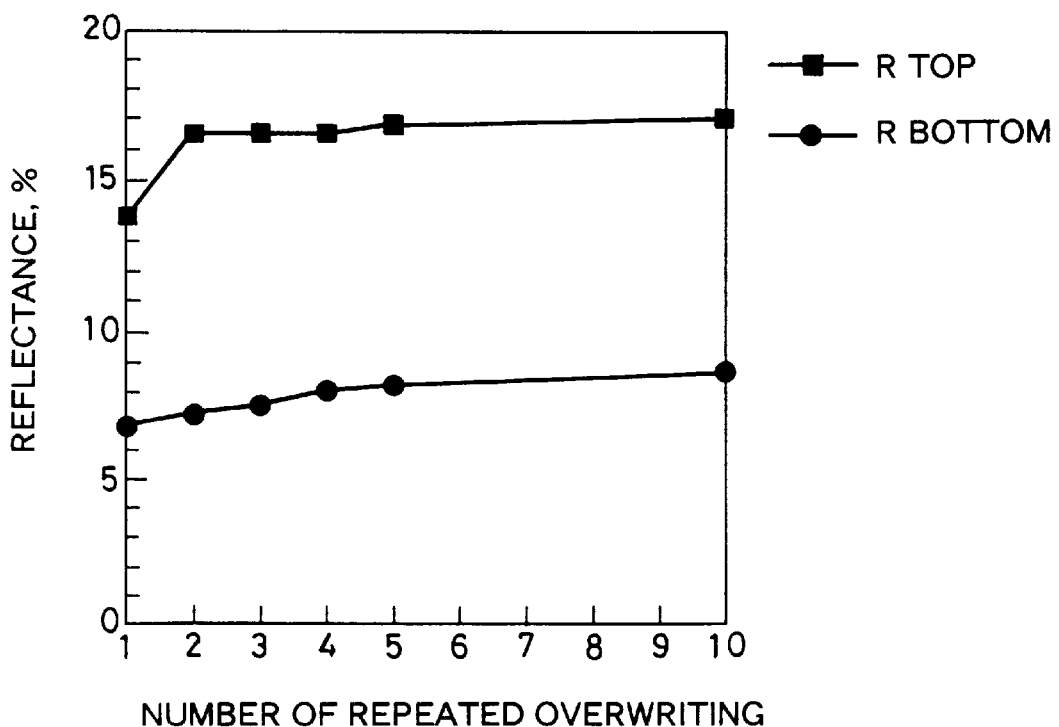
FIG. 4 is a graph showing reflectance $R_{top}$ of crystalline portion and reflectance $R_{bottom}$ of non-crystalline portion in relation to the number of repeated overwriting operations when the optical recording medium of phase change type is repeatedly overwritten in another sample of the invention.

After the mixing treatment, Sample 2A was overwritten as in the case of Sample 1A to examine the alteration of the reflectance associated with the repeated overwriting. The results are shown in FIG. 4. In the case of Sample 2A, the reflectance of the crystalline region ($R_C$) was 17.0% and the reflectance of the amorphous region ($R_A$) was 8.6% after repeated overwriting for ten times. As demonstrated in FIG. 4, the alteration in reflectance induced by the repeated overwriting operations in the case of Sample 2A is smaller than that of the Sample 1A shown in FIG. 3. The reason for the faster stabilization of the reflectance in Sample 1A compared to Sample 2A is estimated to be the structure of the recording layer of Sample 2A, that is, the sandwich structure wherein the Te-based thin film is sandwiched by the reactive thin films, which promotes more rapid and more uniform mixing between the two types of films compared to the case of Sample 1A.

Example 3

Sample 3A was prepared by repeating the production procedure of Sample 1A of Example 1 except that the reactive thin film was of the composition: $Ge_{0.485}Sb_{0.485}Sn_{0.03}$. Sample 3A had a reflectance ($R_o$) of 16.0%.

Sample 3A was subjected to a mixing treatment at a linear velocity of 5 m/s and a power of 4 mW. The reflectance after the mixing treatment was 12.0%. The rewritable optimal linear velocity examined after the mixing treatment was 5 m/s.

Sample 3A which had been subjected to the mixing treatment was subsequently overwritten as in the case of Sample 1A. The reflectance of the crystalline region ($R_C$) was 17.0% and the reflectance of the amorphous region ($R_A$) was 6.8% after repeated overwriting for ten times. The reflectance was stabilized after overwriting for about 5 times.

Example 4

Sample 4A was prepared by repeating the production procedure of Sample 1A of Example 1 except that the recording layer 4 was formed by depositing the Te-based thin film (Te, 100%) of 10 nm thick by sputtering and the reactive thin film (Ge, 100%) of 10 nm thick by sputtering in this order, and the first dielectric layer was deposited to a thickness of 70 nm and the reflective layer was deposited to a thickness of 50 nm. Sample 4A had a reflectance ($R_o$) of 20.0%. Crystallization of the Te-based thin film was confirmed by electron diffraction while the reactive thin film was noncrystalline.

Next, the Sample 4A was recorded with (1–7) RLL recording signals by rotating the disc at a linear velocity of 10 m/s and at a recording power of 6 mW without applying the erase power. The noncrystalline part of the record mark had a reflectance of 11%.

Sample 4A was irradiated with a laser beam at a linear velocity of 10 m/s which is the linear velocity used in the recording. The record mark could not be erased (crystallized) irrespective of the power of the laser beam. The record mark could be erased only when the linear velocity was reduced to 1 m/s.

These results reveal that an optical recording medium of phase change type which can be used as a write once read many-type medium with no initialization treatment has been realized in the present invention.

The merits of the present invention are evident from the results of the Examples as described above.

Example 5

A disc shaped substrate 2 having a diameter of 120 mm and a thickness of 0.6 mm was prepared by injection molding polycarbonate. A groove was formed in one major surface of the substrate simultaneous with the injection molding. The groove had a width of 0.60 μm, a depth of 50 nm, and a pitch of 1.20 μm. On the grooved surface of the substrate, there were formed a first dielectric layer 31, a recording layer 4, a second dielectric layer 32, a reflective layer 5, a third dielectric layer 33, and a protective layer 6 to produce the optical recording disc sample of the constitution as depicted in FIG. 1.

The first dielectric layer 31 was formed as in the case of Sample 1A except that the layer was deposited to a thickness of 130 nm. The second dielectric layer 32 was formed as in the case of Sample 1A except that the layer was deposited to a thickness of 15 nm. The reflective layer 5 was formed to a thickness of 50 nm by sputtering a ZnS (85 mol %)-SiO$_2$ (15 mol %) target in argon atmosphere. The protective layer 6 was formed as in the case of Sample 1A.

The recording layer 4 was of trilayer structure as in the case of Sample 2A disposed in the same order except that the Te-based thin layer was deposited to 8.8 nm and the reactive thin layers were deposited to 3.6 nm. The recording layer had a total thickness of 16 nm. Crystallization of the Te-based thin film was confirmed by electron diffraction while the reactive thin film was noncrystalline.

Sample 5A with no protective layer 6 was measured for the light transmittance of the mirror region (crystalline region) with a spectrophotometer by directing a laser beam at a wavelength of 680 nm. The light transmittance was measured to be 55.0%. Sample 5A had an Ac/Aa of 1.25 at a wavelength of 680 nm.

The reflectance (R$_o$) of the samples immediately after the production was 21.0%. It should be noted that the reflectance is measured in this Example at a wavelength of 680 nm.

Next, Sample 5A was rotated at a linear velocity of 12 m/s, and irradiated with a laser beam at a power of 8 mW (wavelength, 680 nm). After the irradiation with the laser beam, the reflectance decreased to 18.3% to confirm the mixing of the Te-based thin film and the reactive thin film. The rewritable optimal linear velocity of Sample 5A was measured to be 12 m/s to demonstrate that the mixing treatment could be accomplished at the linear velocity equal to the rewritable optimal linear velocity.

Sample 5A after the mixing treatment was evaluated for the recording/reproducing properties, and it was then revealed that Sample 5A exhibits stable recording/ reproducing properties from the first overwriting operation as in the case of Sample 2A.

The merits of the present invention are apparent from the results of the Examples as described above.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for producing the optical recording medium of chase change type comprising a transparent substrate and a recording layer on the transparent substrate, wherein said recording layer comprises Te-based thin film and reactive thin film mixed with each other, said recording layer constituting Te crystalline phase dispersed in amorphous phase to reduce reflectance, said Te-based thin film is in contact with said reactive thin film, said Te-based thin film is formed from a Te-based material containing at least 95 at % of Te; and said reactive thin film is formed from a (Ge, Sb)-based material mainly comprising Ge and/or Sb, at least one of the Te-based material and the (Ge, Sb)—based material contains a metal, M, which is at least one element selected from the group consisting of Al, Si, Ti, V, Cr, Mn, Fe, Co, Ni, Cu, Zn, Y, Zr, Nb, Mo, Ru, Rh, Pd, Ag, Cd, In, Sn, La, Ce, Pr, Nd, Sm, Gd, Tb, Dy, Hf, Ta, W, Au, Tl, Pb and Bi; and said element M is present in the recording layer at a contant of not more than 5 at % and said element M is present in the Te-based material at a content of not more than 5 at %, said method comprising the steps of:

mixing the material constituting the Te-based thin film and the material constituting the reactive thin film by irradiating a laser beam to form recording marks; and the recording marks are not crystallizable under the same conditions as the conditions used for mixing the Te-based thin film and the reactive thin film.

2. A method for producing the optical recording medium of phase change type comprising a transparent substrate and a recording layer on the transparent substrate, wherein said recording layer comprises Te-based thin film and reactive thin film mixed with each other, said recording layer constituting Te crystalline phase dispersed in amorphous phase to reduce reflectance, said Te-based thin film is in contact with said reactive thin film, said Te-based thin film is formed from a Te-based material containing at least 95 at % of Te; and said reactive thin film is formed from a (Ge, Sb)-based material mainly comprising Ge and/or Sb, at least one of the Te-based material and the (Ge, Sb)—based material contains a metal, M, which is at least one element selected from the group consisting of Al, Si, Ti, V, Cr, Mn, Fe, Co, Ni, Cu, Zn, Y, Zr, Nb, Mo, Ru, Rh, Pd, Ag, Cd, In, Sn, La, Ce, Pr, Nd, Sm, Gd, Tb, Dy, Hf, Ta, W, Au, Tl, Pb and Bi; and said element M is present in the recording layer at a contant of not more than 5 at % and said element M is present in the Te-based material at a content of not more than 5 at %, said method comprising the steps of:

initializing the material by mixing the material constituting the Te-based thin film and the material constituting the reactive thin film by irradiating the recording layer with a continuous laser beam.

3. A method for producing the optical recording medium of either claim 1 or 2, said method comprising the step of:

heat treating the medium at a temperature in the range of 50 to 120 degrees C. after forming the recording layer.

4. The method according to claim 2, further comprising the step of:

controlling the linear velocity V$_M$ of the recording layer relative to the laser beam in said step of mixing and the linear velocity V$_W$ of the recording layer relative to the laser beam such that 0.2 V$_W$≦V$_M$.

5. The method according to claim 2, further comprising the step of:

controlling the linear velocity V$_M$ of the recording layer relative to the laser beam in said step of mixing and the linear velocity V$_W$ of the recording layer relative to the laser beam such that V$_W$≦V$_M$.

* * * * *